Nov. 27, 1928.  E. G. McCAULEY  1,693,450
AIRCRAFT PROPELLER
Filed Jan. 30, 1925
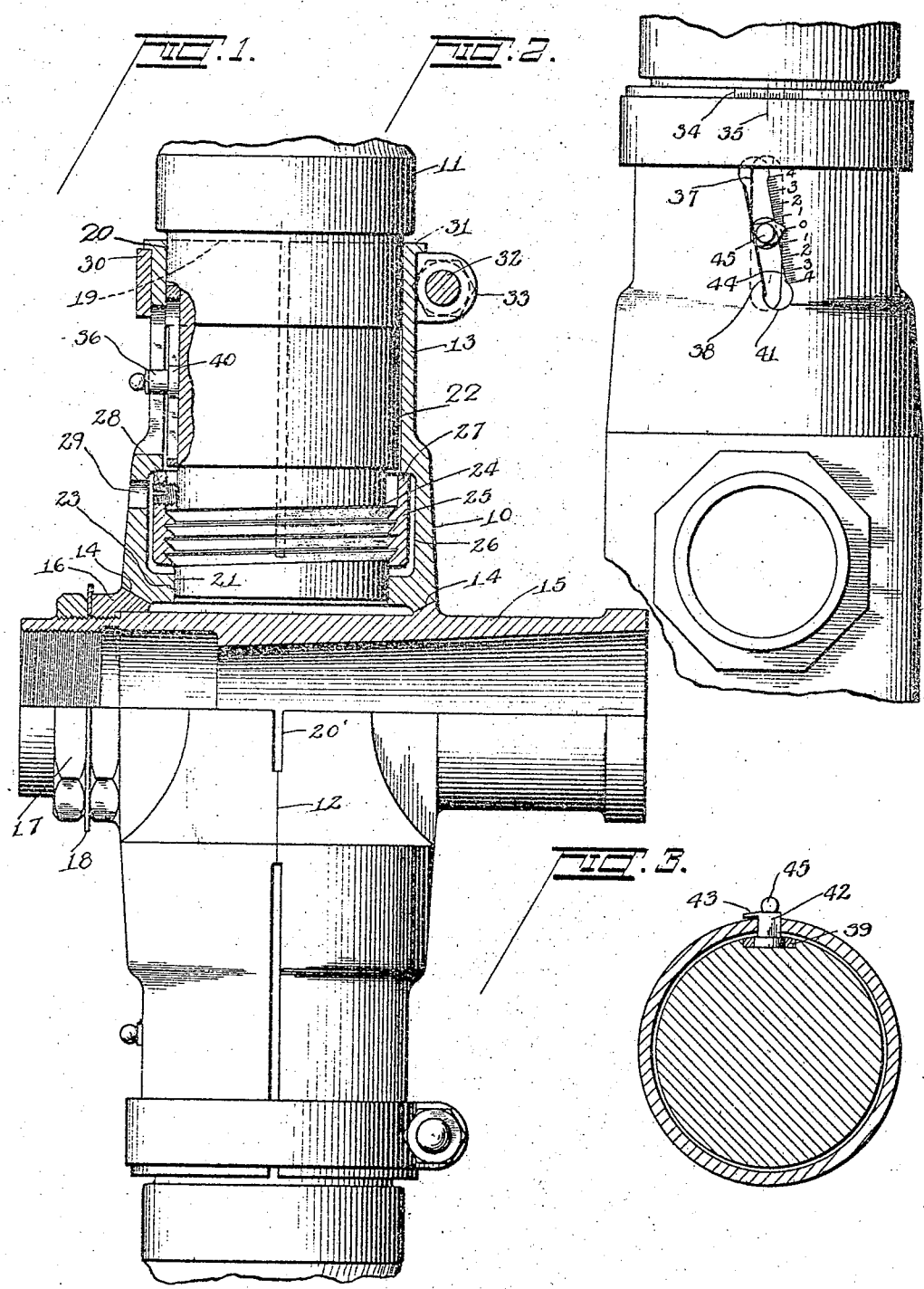
INVENTOR
ERNEST G. McCAULEY
BY
ATTORNEY Patented Nov. 27, 1928.

1,693,450

UNITED STATES PATENT OFFICE.

ERNEST G. McCAULEY, OF DAYTON, OHIO.

AIRCRAFT PROPELLER.

Application filed January 30, 1925. Serial No. 5,837.

This invention relates to improvements in aircraft propellers and has particular reference to the provision of improved means for balancing and setting the blades of a propeller.

One of the principal objects of the invention is to provide an adjusting nut on the inner end of the propeller blade permitting easy endwise adjustment of the blade in the socket in changing the diameter of the propeller or in securing horizontal balance, a special feature consisting in the provision of means whereby the nut may be secured against turning with respect to the blade after the endwise adjustment when securing the proper pitch setting of the blade or for holding the nut with the socket to enable the turning of the blade in the nut in the endwise adjustment of the blade.

Another object of the invention consists in providing a means enabling accurate adjustment of the blade in decreasing or increasing the pitch, the provision being such that adjustment may be made to small fractions of a degree.

A still further object is to provide in connection with a pair of clamping rings which clinch the blades in their adjusted positions in the opposed blade sockets, scales and index marks by means of which the setting of the rings may be noted and both rings set the same to maintain dynamic and static balance.

The invention embraces other objects and advantages to be brought out in the course of the following description. In the description, reference is made to the accompanying drawing, wherein Fig. 1 is a plan view of the hub of a propeller constructed in accordance with the invention, one-half of the hub appearing in elevation and the other half in longitudinal section.

Fig. 2 is a front view of one of the blade sockets showing the pitch angle indicating means in elevation and the setting indication of the clamping ring.

Fig. 3 is a fragmentary sectional detail of the pitch angle indicating means.

The propeller hub 10, which is generally cylindrical in form, is divided along a longitudinal median plane into half sections which, when placed together, form opposed blade sockets to receive the propeller blades 11. The halves of the hub have their edges lying in flush engagement at the middle as indicated at 12, but at both ends the edges are in spaced relation to afford resilient walls for sockets 13 to enable clamping the propeller blades 11 in the sockets. The halves of the hub 10 have registering openings 14 to receive a cylindrical engine shaft hub 15. The latter is suitably splined or keys are provided to fix the halves of the hub against rotation with reference thereto when the halves are mounted thereon. The openings 14 are of a tapering form as indicated, so that the halves are self-centering and are in proper right angular relation to the hub 15 when the cone nut 16 is threaded home on the outer end of the hub. A lock nut 17 and lock washer 18 are usually provided in connection with the nut 16 to prevent loosening thereof. The tightening of the nut 16 usually results in jamming of the halves of the hub quite snugly on the hub 15 and it has been found that the removal of the hub 10 is practically impossible where it is attempted to pry the outer half off by the insertion of a tool between the spaced edges 19, inasmuch as this produces binding of the outer section in the splines of the hub 15. For this reason I provide a tool slot 20' between the flush edges 12 so that the prying of the outer half of the hub 10 is along the axis of the hub 15 in which case no binding occurs and the removal of the hub 10 is greatly simplified.

The blade 11 has an outer bearing portion 20 and inner bearing portion 21 at the extreme outer and inner ends of the socket 13. The bearing portion 20 stands in relief due to the adjacent portion 22 being of reduced cross section. The blade 11 is clamped in the socket 13 about the bearing portion 20 by the drawing together of the halves of the hub permitted by their spaced relation. The inner bearing portion 21, it will be noted, is received in a cylindrical recess 23 in the inner end of the socket 13 adjacent the middle of the hub 10 where the edges of the halves of the hub are in flush engagement. Despite the fact that the halves of the hub 10 are firmly secured on the hub 15, a relatively easy moving fit or rotational bearing is afforded at 23 for the inner end of the propeller blade.

The blade 11 is threaded adjacent the inner bearing portion 21 as shown at 24 to receive a cylindrical nut 25 received freely within an annular recess 26 in the socket 13. The recess 26 provides a bearing at 27 for the front face of the nut 25 so that the latter constitutes an abutment for the blade 11 in the socket 13. The nut 25 is adjustable endwise of the blade to increase or decrease the diameter of the propeller or to permit the adjustment of one blade to secure a horizontal balance of the propeller. In adjusting the blade endwise in the nut the latter is held by a screw 28 engaging in an opening 29 in the wall of the socket 13. The screw 28 serves as a set screw to fix the nut on the blade when it is desired to prevent the rotation of the nut with respect to the blade, as for example, after the diameter adjustment or balancing operation. The opening 29 serves to admit a screw driver or other tool for tightening the screw 28 and also serves, when the screw 28 is loosened, to receive the blade in and out in the nut.

After the adjustment of the blade, it is fixed by the clamping ring 30 which encircles the socket 13 about the outer bearing portion 20 of the blade. The slight shoulder 31 is provided on the hub 10 to prevent endwise movement of the ring 30 off the hub. The rings 30 are fitted with bolts 32 passing through lugs 33, for drawing the ends of the hub into extremely tight engagement with the blade about the outer bearing portion 20 and positively prevent the rotation of the blade or any loosening or consequent vibration after the blade is in service.

The bolts 32 and the lugs 33 of the clamping rings 30 constitute balancing weights used in the vertical balancing of the propeller. It is imperative that both rings occupy identical positions on the opposite ends of the hub in order to maintain a true dynamic balance. For this reason I provide a scale 34 about the rim of the flange 31 with respect to which an index marker 35 on the clamping ring 30 is arranged to move in angular adjustment of the ring on the hub. Once the blade is vertically balanced the setting of the rings 30 should be maintained, and if it becomes necessary at any time to change the pitch setting, in which case the clamping rings 30 would have to be loosened to enable the turning of the blades in the sockets, the rings are returned to their proper positions if care has been taken to note the setting of the rings before loosening the same.

The pitch setting of the blade is indicated by an index plug 36 which is movable longitudinally of the blade in a slot 37 and also movable in a slot 38 provided in the wall of the socket 13 at an acute angle with respect to the slot 37. If desired, the slot 37 may be machined very accurately in a plate 39 with the slightest practicable tolerance and the plate 39 fastened by screws or other means in a recess in the end of the blade. This may be found necessary inasmuch as duralumin or micarta and other substances used in the making of blades do not submit to accurate machining and a slot of the character of the slot 37 might in time show perceptible wear.

The plug 36 has an enlarged cylindrical end 40 moving in the slot 37 which may be inserted through an enlarged circular opening 41 in the end of the slot 38 in the socket wall. The shank 42 of the plug 36 is reduced and has flat sides slidable along the sides of the slot 38. A pointer 43 is provided on the shank 42 which moves over a scale 44 provided on one side of the slot 38. The scale 44 is calibrated in degrees, each unit being divided preferably into two-tenths subdivisions. The acuteness of the angle which the slot 38 makes with the slot 37 enables as coarse a scale as that shown. The zero point of the scale is taken as the computed pitch of a blade, the computation being the basis of a fixed pitch propeller provided for an aircraft having a certain engine and certain operating characteristics. The adjustment one way or another from the zero indication decreases or increases the pitch. It will be obvious that the turning of the blade in the socket when the clamping ring is loosened will produce movement of the index one way or another dependent on whether the pitch is increased or decreased. As the fit of the index plug is necessarily very close in both of the slots 37 and 38, it is desirable to provide a knob 45 on the end of the plug which can be engaged and assisted in the proper direction to avoid the blade binding.

I claim:

1. In a propeller, a hub having a blade socket for receiving the end of a propeller blade, the inner walls of said socket being provided with a recess for receiving an abutment member therein, said member providing means for balancing said propeller.

2. In a propeller, a hub having a blade socket for receiving the end of a blade, the inner walls of said socket being provided with a recess for receiving an adjusting abutment member therein, said blade being adjustable endwise of said member to balance said propeller.

3. In a propeller, a hub having a blade socket for receiving the end of a blade, a recess in said socket for receiving an adjustable abutment member therein, said blade being adjustable endwise of said member and in said socket to obtain the horizontal balance thereof.

4. In a propeller, a hub split longitudinally to form two halves which provide opposed blade sockets, the inner walls of said sockets being provided with a recess for receiving the end of a propeller blade, and an adjustable threaded member for said blade received in said socket recess for varying the projecting length of said propeller blade to balance the same.

5. In a propeller, a hub split longitudinally to form two halves which provide opposed blade sockets, the inner walls of said sockets being provided with a recess for receiving the end of a propeller blade, an adjustable threaded member for said blade received in said socket recess, and a set screw associating the sockets and adjusting members respectively for holding said members against turning when adjusting said blades endwise therein.

6. In a propeller, a hub split longitudinally to form two halves which provide opposed blade sockets, the inner walls of said sockets being provided with a recess for receiving the end of a propeller blade, an adjustable threaded member for said blade received in said socket recess, and means for holding said member stationary with said socket.

7. In a propeller a hub having a blade socket, a propeller blade received therein, and a nut threading on the end of said blade to provide an adjustable abutment therefor, said socket having an opening in the wall thereof to admit a tool to engage fastening means to secure said nut to said blade.

8. In a propeller a hub having a blade socket, a propeller blade received therein, a nut threading on the end of said blade within said socket to provide an adjustable abutment therefor, and a screw for fixing said nut in an adjusted position on said blade, said socket having an opening in the wall thereof to admit a tool for tightening said screw, said opening serving to receive the screw when loosened whereby to hold said nut with said socket.

9. In a propeller a hub having a blade socket, a propeller blade received therein and a nut threading on the end of said blade within said socket, said nut and said socket having openings therein arranged to be placed in register to receive means engaged between the nut and the socket for holding the nut with the socket.

10. In a propeller a hub split longitudinally to provide two halves forming a pair of opposed blade sockets when the halves are placed together, the edges of the halves lying in flush engagement at the middle but in spaced relation at the ends whereby to provide clamping portions, blades received in said sockets, each having an end bearing received in recesses in the inner ends of said sockets adjacent the points where the edges of the halves lie in flush engagement and having bearing portions spaced from the ends of the blades received in said sockets at the points where the edges of the halves are spaced whereby said blades may be clamped in said sockets.

11. In a propeller a hub split longitudinally forming two halves providing opposed blade sockets when the halves are placed together, said halves being in flush engagement at their edges at the middle but having the edges in spaced relation at the ends, an abutment member received in each of said sockets adjacent the middle where the edges of the halves are in engagement providing a rotational bearing for the ends of propeller blades, the ends of said halves where the edges are spaced constituting clamping means for securing the blades in the sockets.

12. In a propeller a hub split longitudinally forming two halves which provide opposed blade sockets when the halves are placed together, the edges of the halves lying in flush engagement at the middle and in spaced relation at the ends giving resiliency to the socket walls for clamping blades therein, clamping rings encircling the sockets to draw the halves together and to secure blades therein, an engine shaft hub for mounting the halves and means for securing the halves together on said hub.

13. In a propeller a hub split longitudinally forming two halves providing opposed blade sockets when the halves are placed together, the edges of the halves lying in flush engagement at the middle and in spaced relation at the ends to afford resiliency in the socket walls whereby propeller blades may be clamped in the sockets between the halves, an engine shaft hub passing through registering openings in the middle of the halves for mounting the halves and means for rigidly affixing the halves together on said hub, a slot being formed between the halves at the middle where the edges are flush to admit a tool for prying the halves apart.

14. In a propeller a hub having a blade socket, a propeller blade received therein having an outer bearing portion standing in relief with respect to the adjacent portion of the blade to be received in said socket, clamping means on said socket adjacent said outer bearing portion, an inner bearing portion on said blade having a moving fit in a recess in the inner end of said socket, and a threaded portion adjacent said inner bearing portion receiving a nut for endwise adjustment of said blade in said socket, said socket having an annular recess therein to receive said nut and provide a bearing for the side of said nut.

15. In a propeller a hub having a blade socket, a propeller blade received therein having an outer bearing portion standing in relief with respect to the adjacent portion of the blade to be received in the outer end of said socket, clamping means on said socket adjacent said outer bearing portion, a threaded portion at the inner end of said blade, a nut threading thereon, an annular recess in said socket to receive said nut and provide an abutment for the side of said nut received in a recess in said socket.

16. In a propeller a hub having a blade socket, a blade received therein, a slot provided in the socket wall, a scale adjacent thereto and an index on said blade projecting into said slot and movable with reference to said scale in the adjustment of said blade to indicate the extent of adjustment thereof.

17. In a propeller a hub having a blade socket, a propeller blade received therein, a slot provided in the socket wall, a scale calibrated in degrees of angular adjustment provided adjacent said slot and an index on said blade movable with reference to said scale in said slot in the angular adjustment of said blade in said socket.

18. In a propeller a hub having a blade socket, a propeller blade received therein, an index on said blade, a longitudinal slot provided for said index, another slot provided in the socket wall to receive said index, said second slot being at an angle to the first slot and having scale readings adjacent thereto.

19. In a propeller a hub having a blade socket, a propeller blade received therein, an index on said blade, a longitudinal slot provided for said index, another slot provided in the socket wall to receive said index, and a scale adjacent said slot with reference to which said index moves in the adjustment of said blade, said second slot being at an acute angle with reference to the first slot to enable the provision of a scale by which a fine adjustment of the blade may be made.

20. In a propeller a hub having a blade socket, a propeller blade received therein, a plug having a bearing in a slot provided in said blade and a bearing in a second slot provided in the socket wall, a pointer on said plug, and a scale on the outside of said socket adjacent the slot therein to indicate the adjustment of the blade.

21. In a propeller a hub having a blade socket, a propeller blade received therein, a plug having a bearing in a slot provided in said blade and a bearing in a second slot provided in the socket wall, a pointer on said plug, a scale on the outside of said socket adjacent the slot therein to indicate the adjustment of the blade, and a knob on the end of said plug for manually manipulating the plug.

22. In a propeller a hub having a blade socket, a propeller blade received therein, a plug having an enlarged end bearing in a slot in said blade and having a reduced portion bearing in a slot provided in the socket wall, the latter slot having an enlarged end to permit the insertion of said plug through the socket wall into the blade slot, and a scale on the outside of said socket adjacent the socket wall with reference to which said plug moves in the adjustment of said blade.

23. In a propeller a hub having a blade receiving socket, a propeller blade therein, a plug having a cylindrical end bearing in a slot provided in said blade and having a portion with flat sides, a pointer on said plug extending over the side of said last mentioned slot and a scale on the outside of said socket over which said pointer moves.

24. In a propeller a hub having a blade socket, a propeller blade received therein, means for clamping said blade in said socket comprising a clamping ring, the bolts and lugs of which provide balancing means for the propeller, and a scale and index mark movable relatively in the movement of the ring on said hub socket to indicate the balancing position thereof.

25. In a propeller a hub having a pair of opposed blade sockets, blades received therein, means for clamping said blades in said sockets comprising clamping rings, the bolts and lugs of which provide balancing means for the propeller at each of said sockets, both of said rings being set in the same position for dynamic and static balance, and a scale and index mark on said hub sockets and rings to show the setting of said rings to obtain said balance.

26. In a propeller, a hub having a blade socket for receiving the end of a propeller blade, the inner walls of said socket being provided with a recess for receiving an abutment member therein, said member providing means for balancing said propeller in one position and a second means for balancing said propeller in a cross-wise position to said first-mentioned position.

27. In a propeller, a hub having a blade socket for receiving the end of a propeller blade, the interior wall of said socket being provided with a recess for receiving an abutment member therein, said blade being adjustable endwise of said member to balance said propeller in a horizontal position, and means movable about the axis of the blade to balance said propeller in a vertical position.

28. In a propeller, a hub split longitudinally forming two halves which provide opposed blade sockets when the halves are placed together for receiving blades therein, the edges of said halves lying in flush engagement at the middle and in spaced relation at the ends, clamping rings encircling the sockets to draw the edges together, an engine shaft hub for mounting the halves and means for securing the edges together on said shaft hub, said means providing rotary movement of said blades when mounted in said sockets.

29. In a propeller, a hub split longitudinally forming two halves which provide opposed blade sockets when the halves are placed together for receiving blades therein, the edges of said halves lying in flush engagement at the middle and in spaced relation at the ends, an engine shaft hub for mounting the halves and means for securing the halves together on said shaft hub, said hub arranged to provide an easy rotary movement of said blade when mounted in said sockets, for adjusting the pitch of said blades.

30. In a propeller, a hub split longitudinally forming two halves which provide opposed blade sockets when the halves are placed together, the edges of said halves lying in flush engagement at the middle and in spaced relation at the outer ends, a blade received therein having an outer bearing portion standing in relief with respect to the adjacent portion of the blade to be received in the outer end of said socket, clamping means on said socket adjacent said outer bearing portion, the inner end of said blade having an abutment member fitting in an annular recess in the wall of said socket, and means for holding said halves together at the middle without clamping said blades.

31. In a propeller, a hub split longitudinally forming two halves which provide blade sockets when the halves are placed together, the edges of the halves being in flush engagement at a central portion and in spaced relation at the ends giving resiliency to the socket walls for clamping blades therein, means for clamping said blades and further means for holding the halves together at the central portion independent of said clamping means.

In testimony whereof I affix my signature.

ERNEST G. McCAULEY.